Dec. 6, 1927.

T. E. PENNOCK 1,651,902

MACHINE FOR APPLYING CLOSURES TO CONTAINERS

Filed March 7, 1921  11 Sheets-Sheet 1

INVENTOR
Theodore E. Pennock
BY
Frederick J. Church
his ATTORNEY

Dec. 6, 1927.

T. E. PENNOCK 1,651,902

MACHINE FOR APPLYING CLOSURES TO CONTAINERS

Filed March 7, 1921  11 Sheets-Sheet 2

INVENTOR
Theodore E. Pennock
BY
his ATTORNEY

Dec. 6, 1927.  1,651,902

T. E. PENNOCK

MACHINE FOR APPLYING CLOSURES TO CONTAINERS

Filed March 7, 1921  11 Sheets-Sheet 3

INVENTOR
Theodore E. Pennock
BY
his ATTORNEY

Dec. 6, 1927.  
T. E. PENNOCK  
1,651,902  
MACHINE FOR APPLYING CLOSURES TO CONTAINERS  
Filed March 7, 1921  11 Sheets-Sheet 4
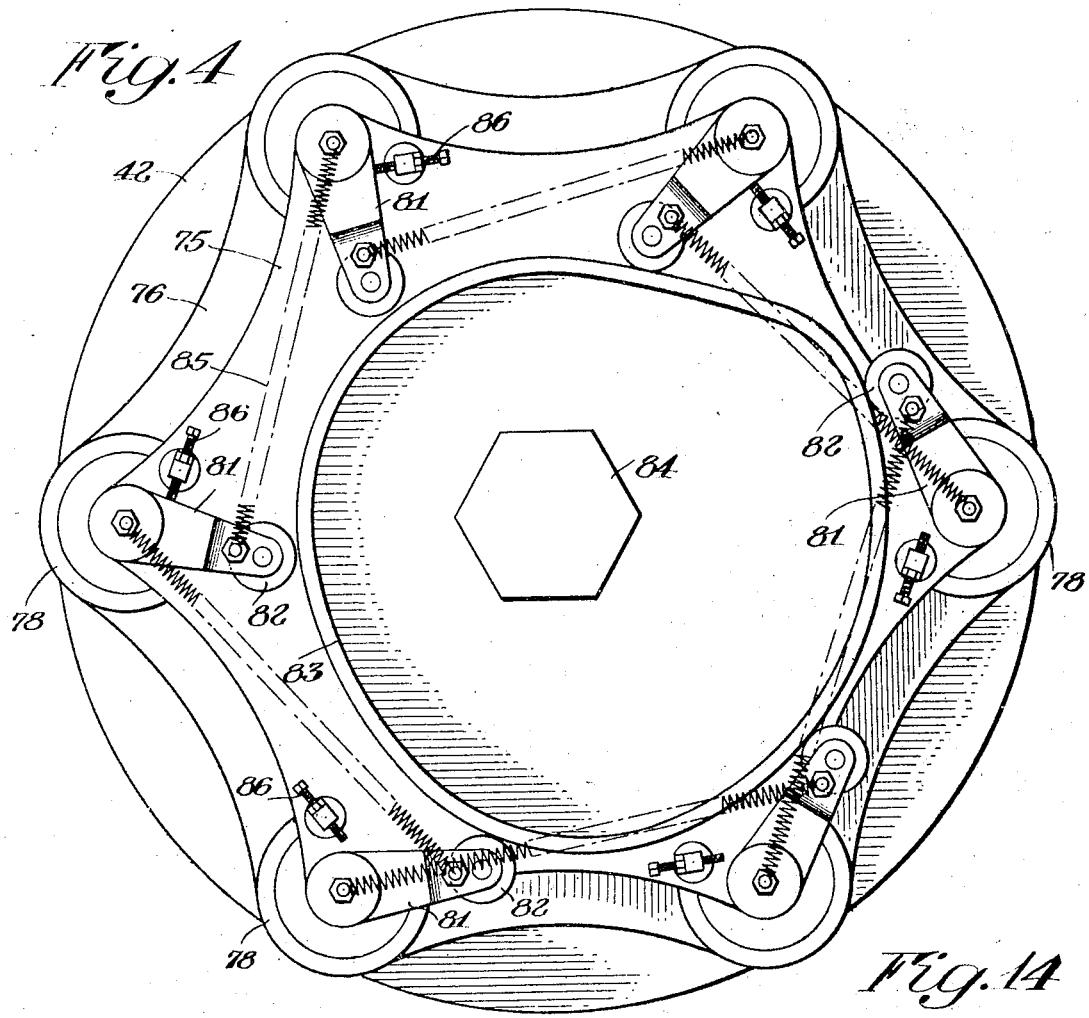
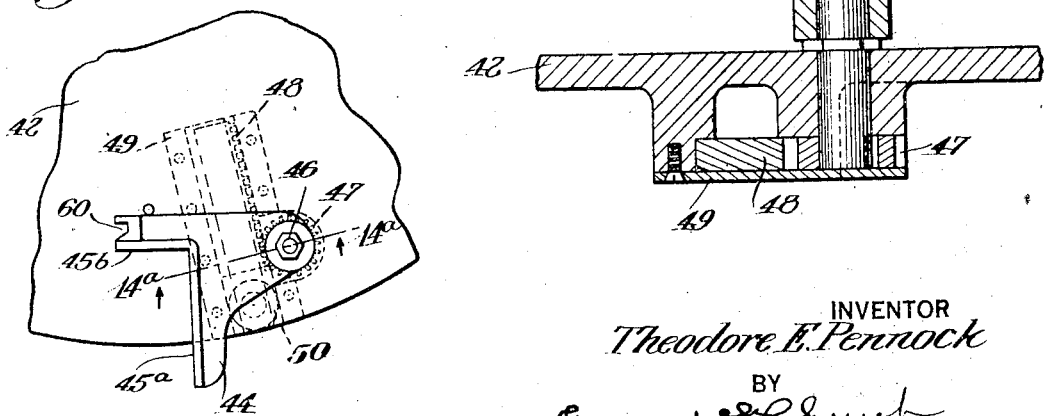
INVENTOR  
*Theodore E. Pennock*  
BY  
*his* ATTORNEY

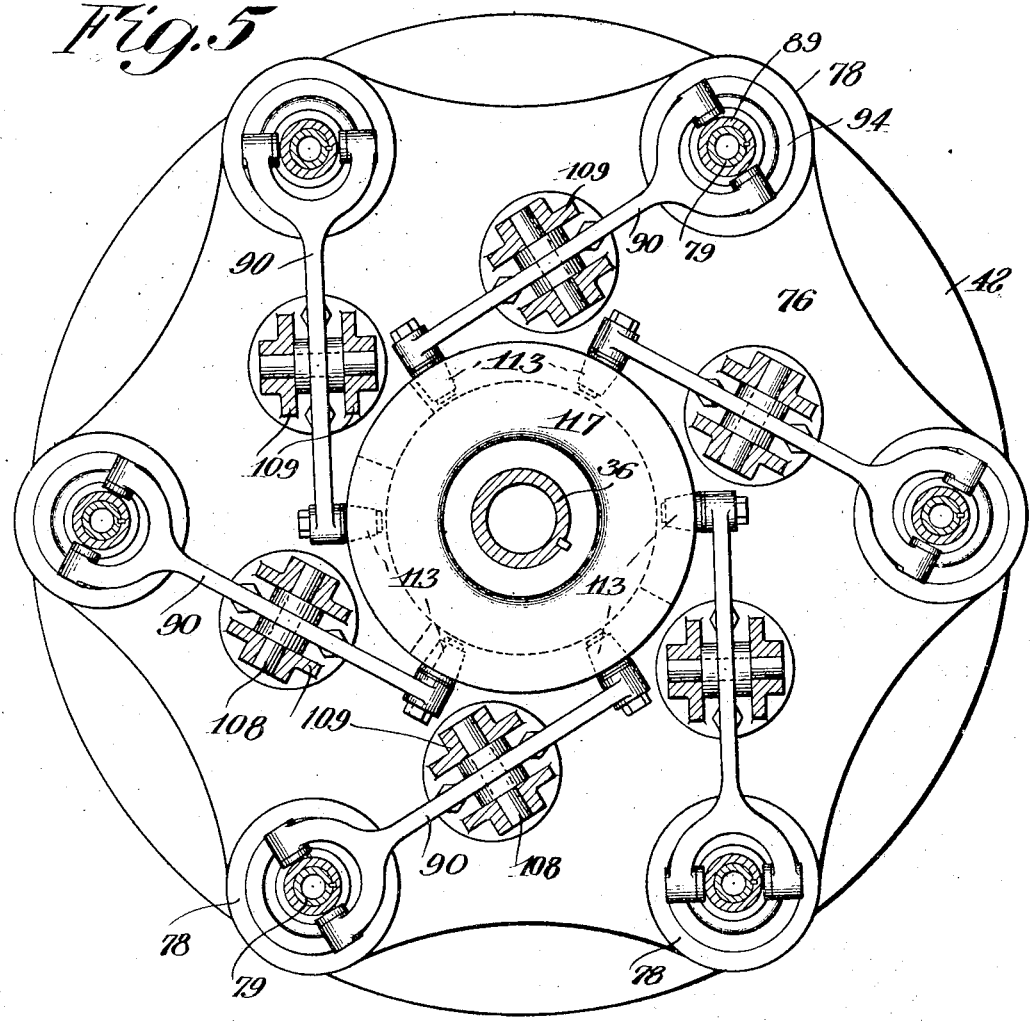
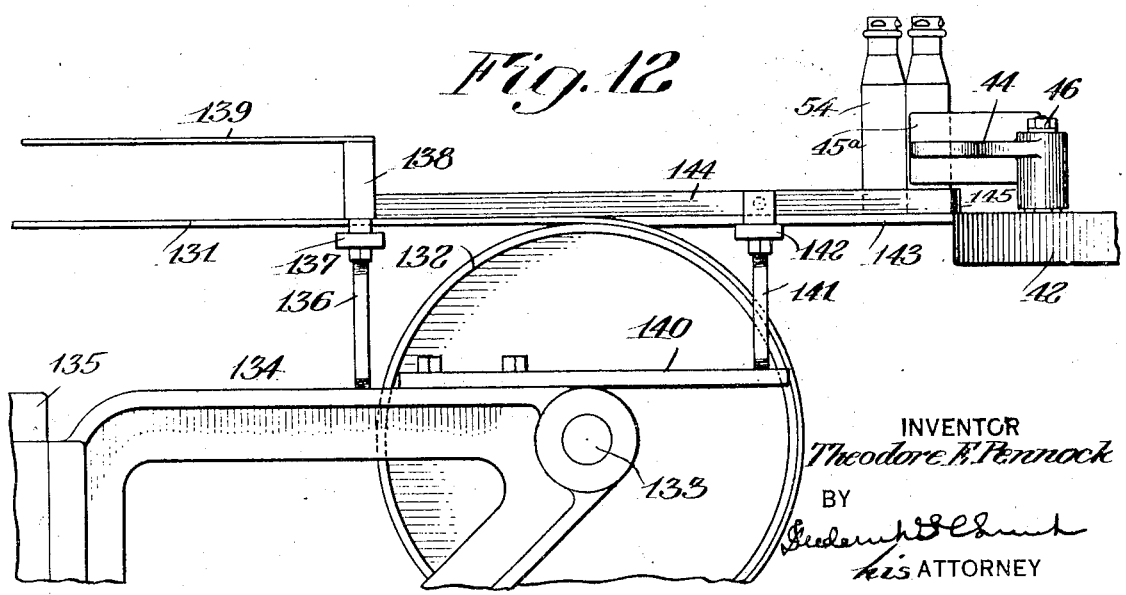

Dec. 6, 1927.
T. E. PENNOCK
1,651,902
MACHINE FOR APPLYING CLOSURES TO CONTAINERS
Filed March 7, 1921 11 Sheets-Sheet 6
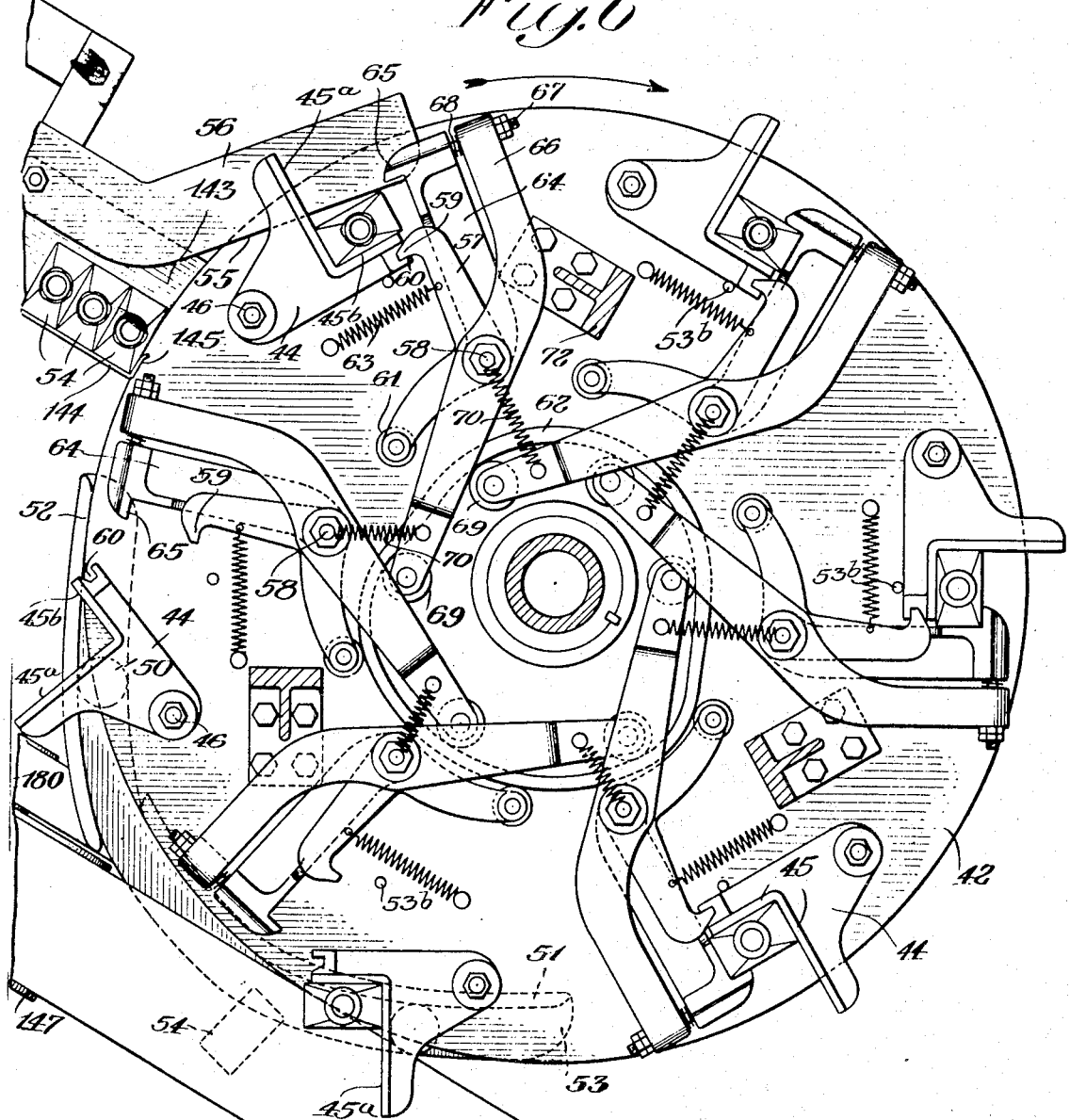
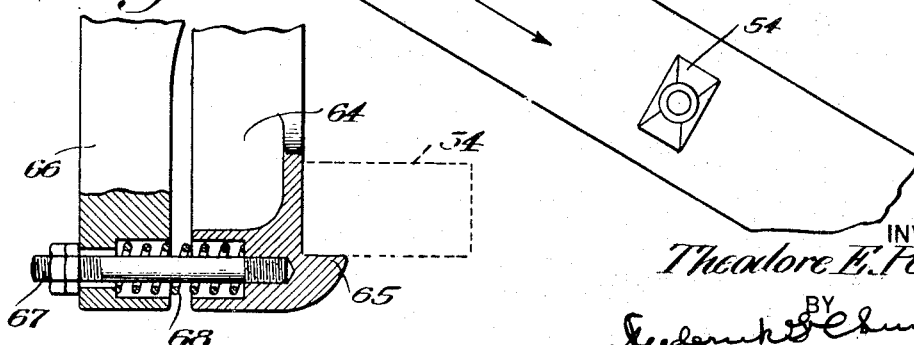
INVENTOR
Theodore E. Pennock
BY
Frederick C. Smith
his ATTORNEY

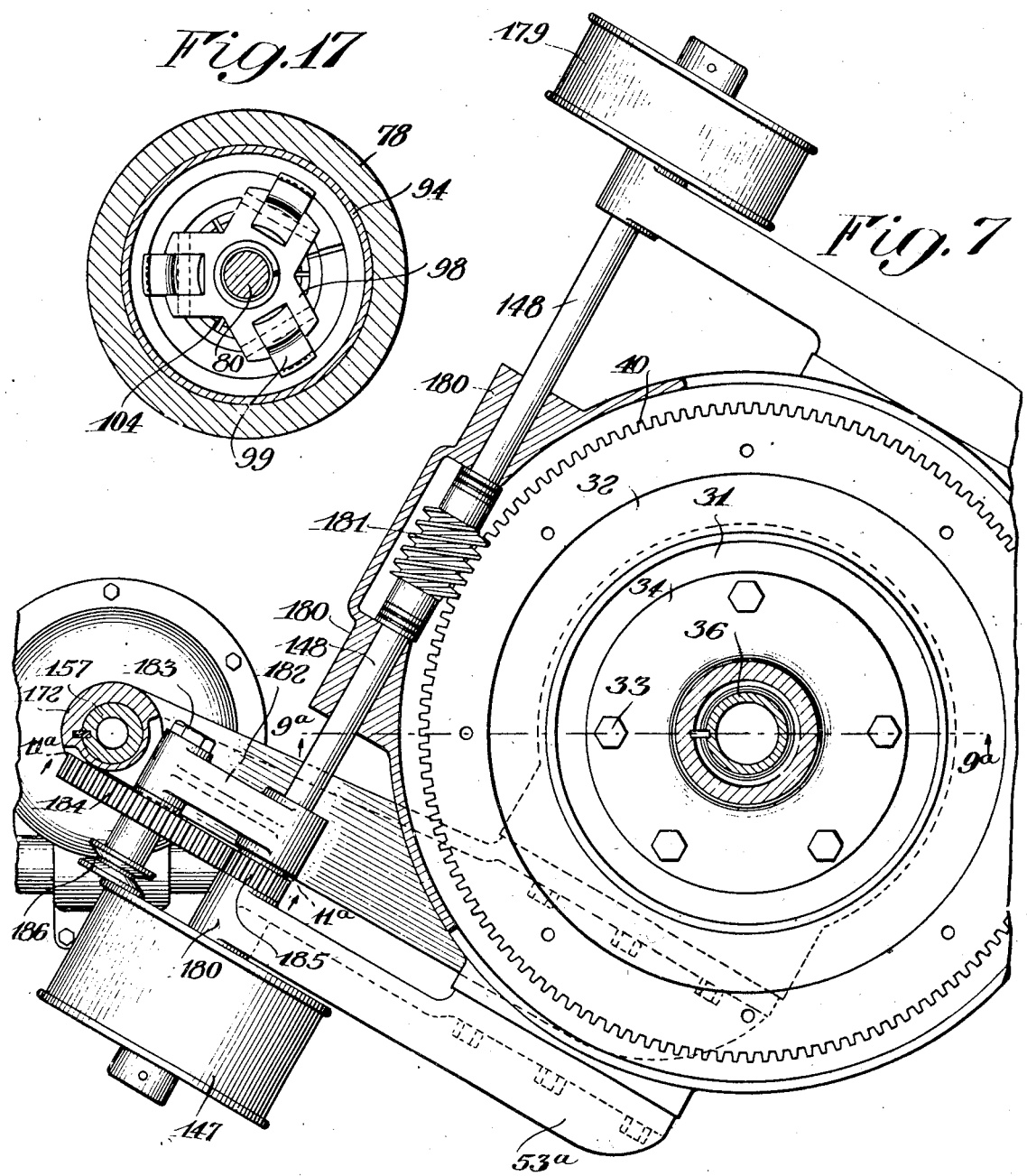

Dec. 6, 1927.  
T. E. PENNOCK  
1,651,902  
MACHINE FOR APPLYING CLOSURES TO CONTAINERS  
Filed March 7, 1921  11 Sheets-Sheet 8
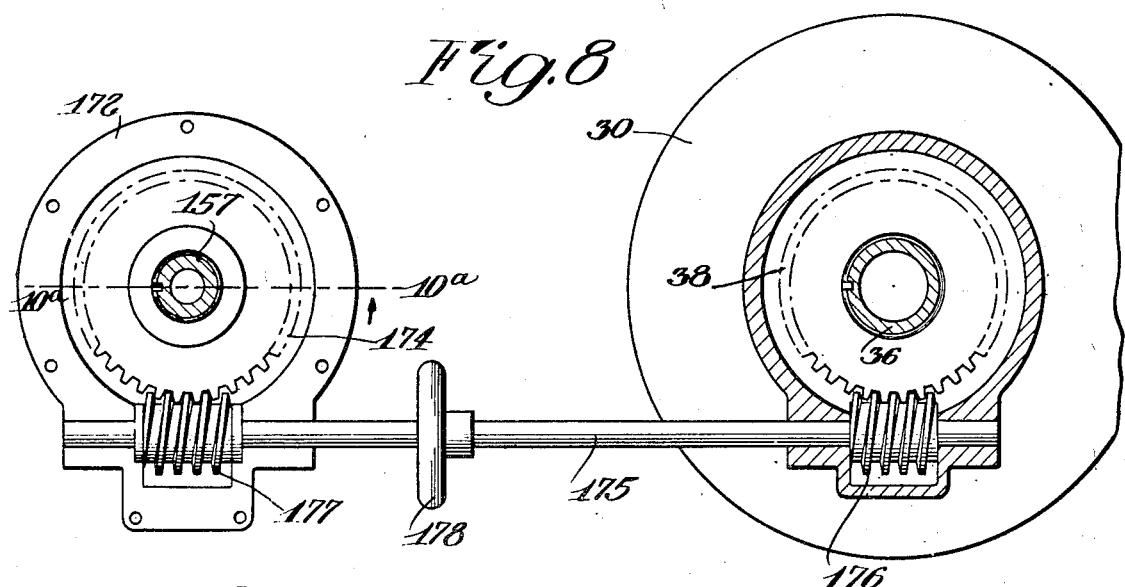
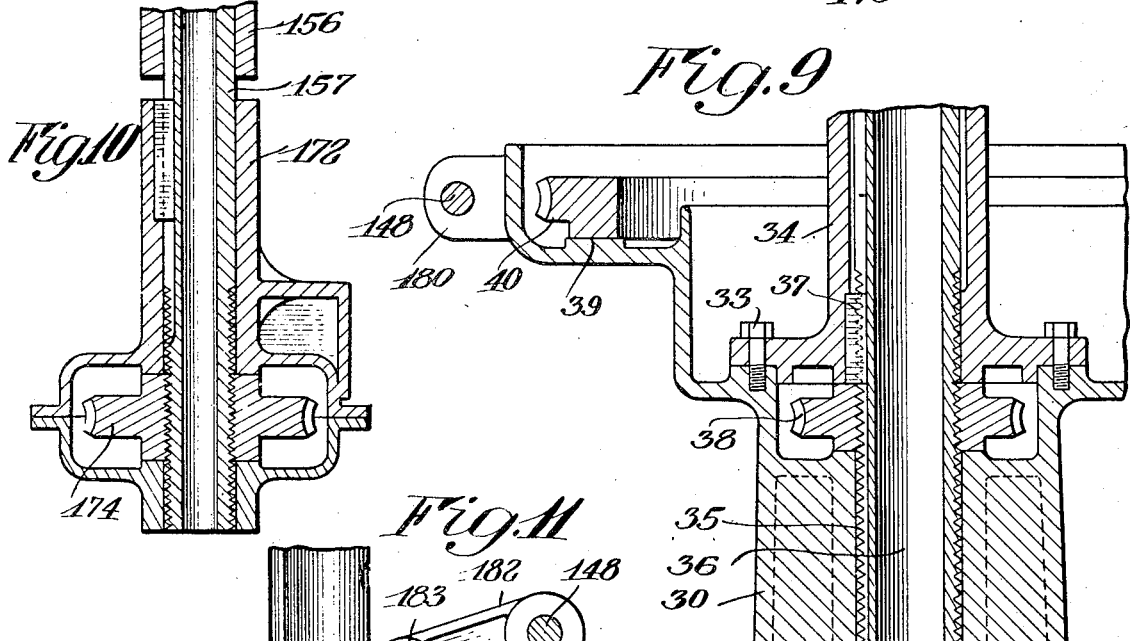
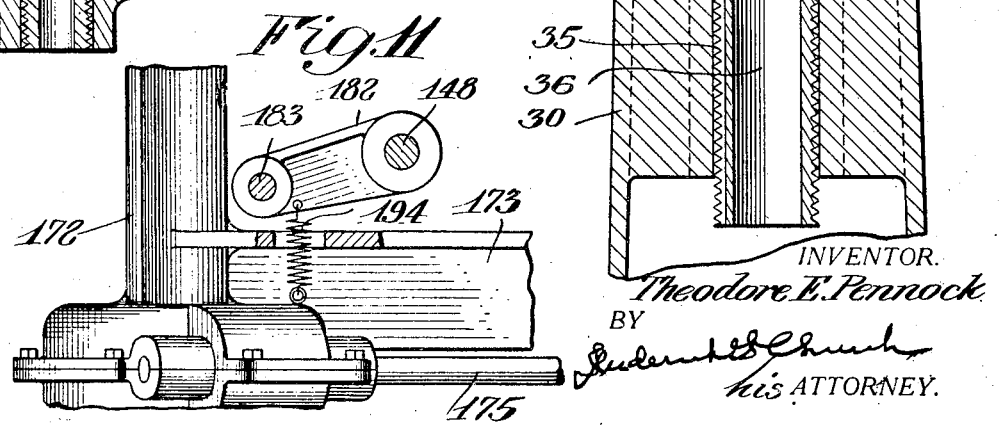
INVENTOR.  
Theodore E. Pennock  
BY  
his ATTORNEY.

Dec. 6, 1927.
T. E. PENNOCK
1,651,902
MACHINE FOR APPLYING CLOSURES TO CONTAINERS
Filed March 7, 1921 11 Sheets-Sheet 9
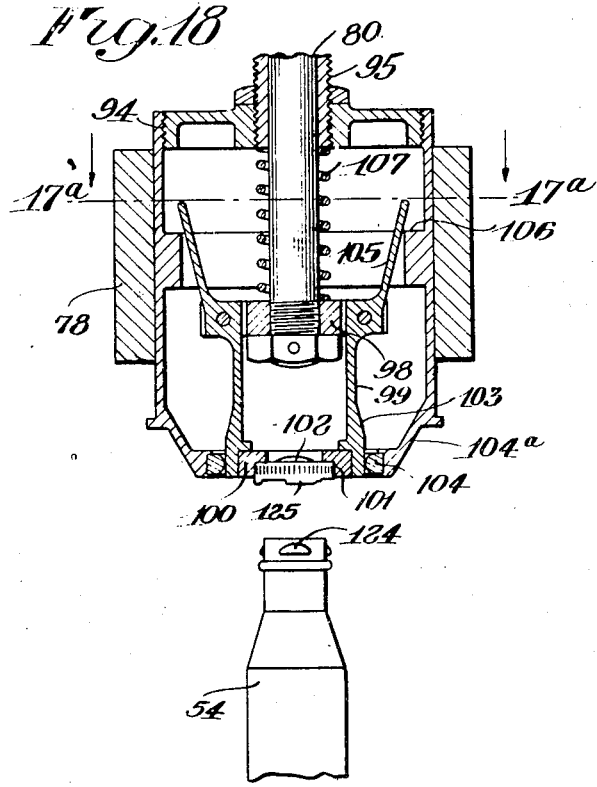
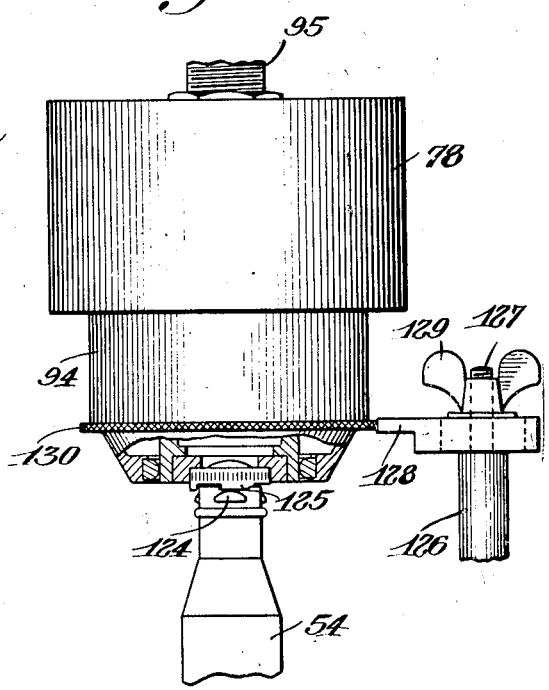
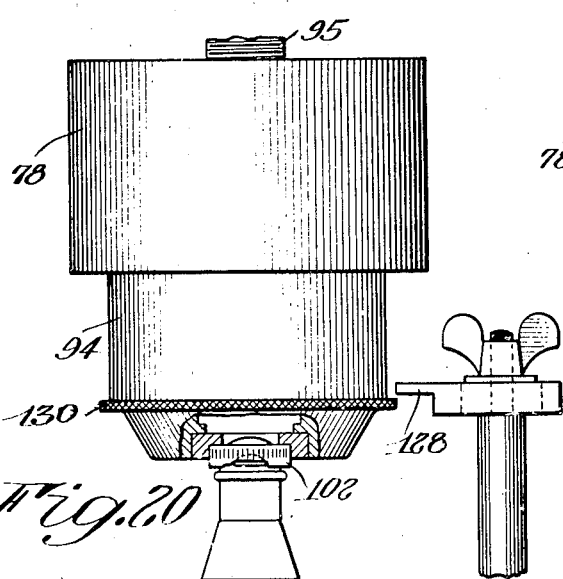
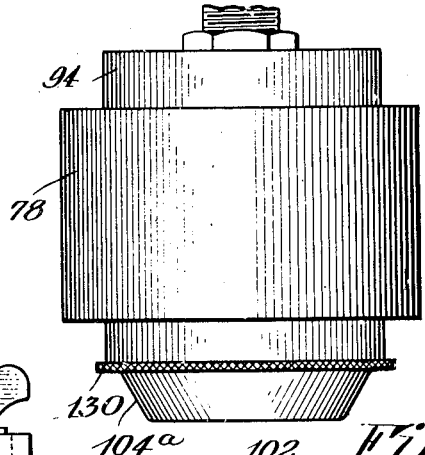
INVENTOR
*Theodore E. Pennock*
BY
*Frederick H. Church*
his ATTORNEY Dec. 6, 1927.
T. E. PENNOCK
1,651,902
MACHINE FOR APPLYING CLOSURES TO CONTAINERS
Filed March 7, 1921 11 Sheets-Sheet 10
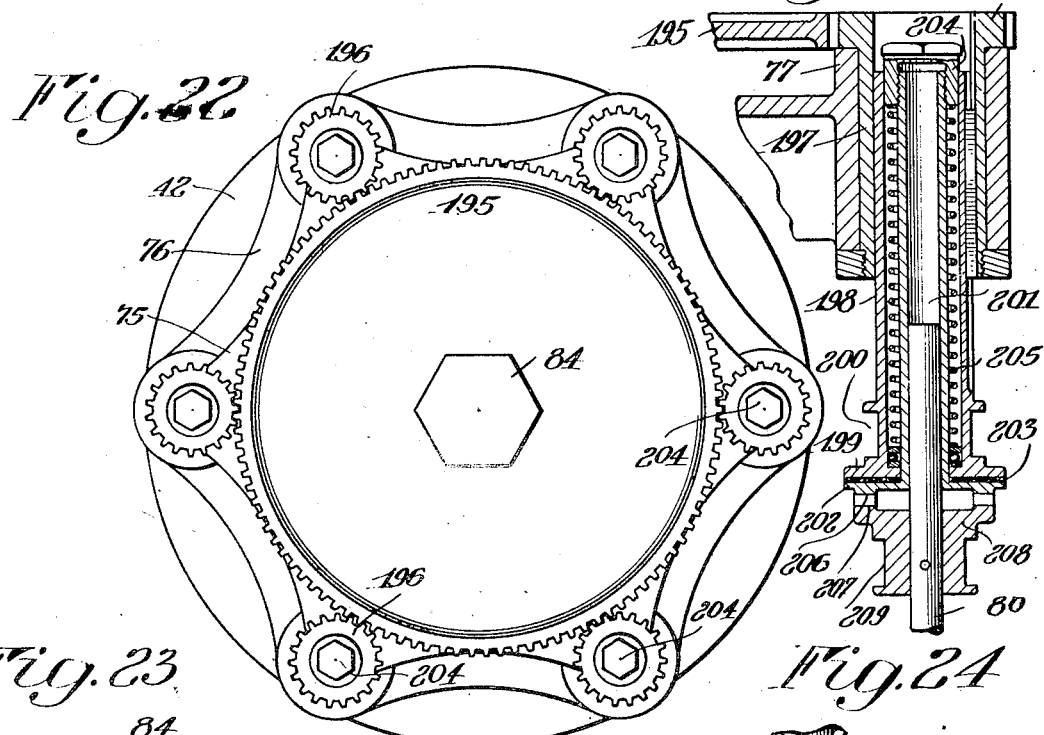
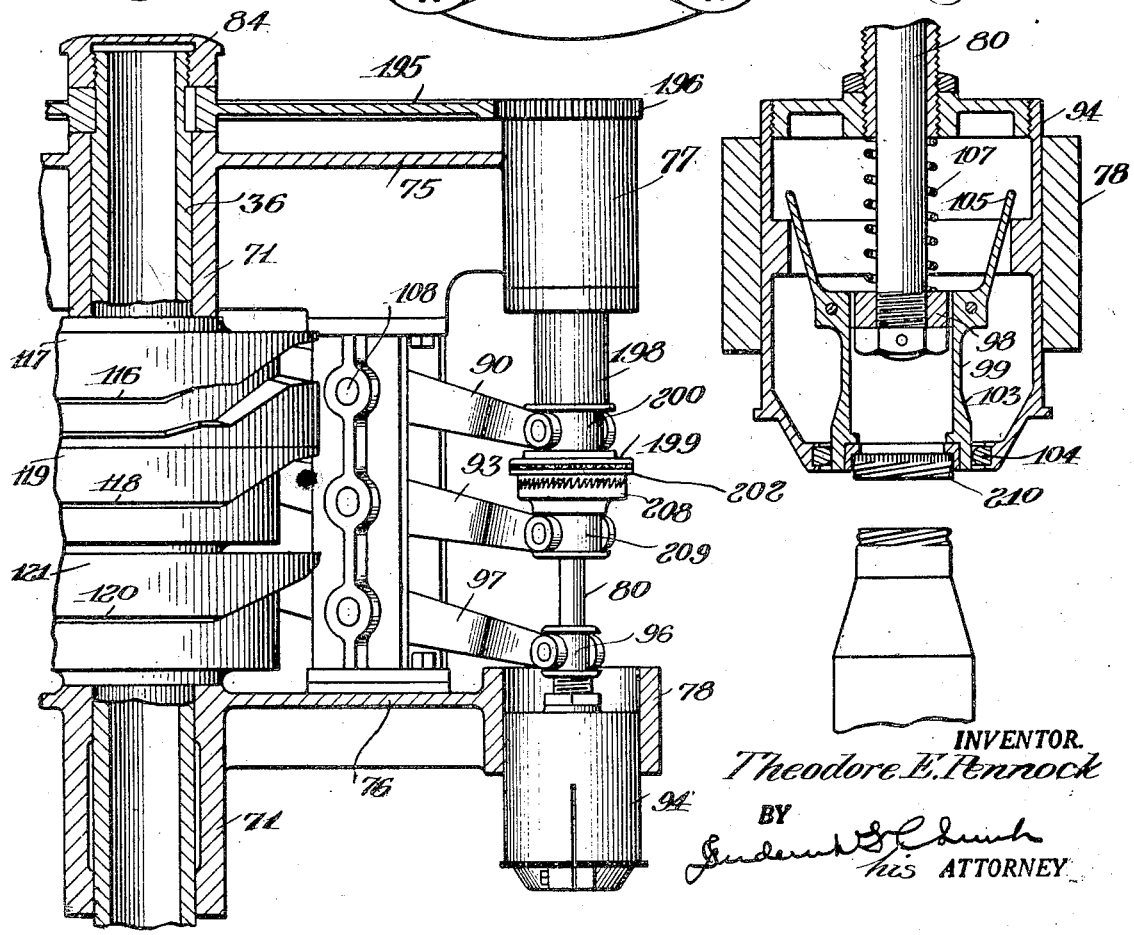
INVENTOR.
Theodore E. Pennock
BY
his ATTORNEY

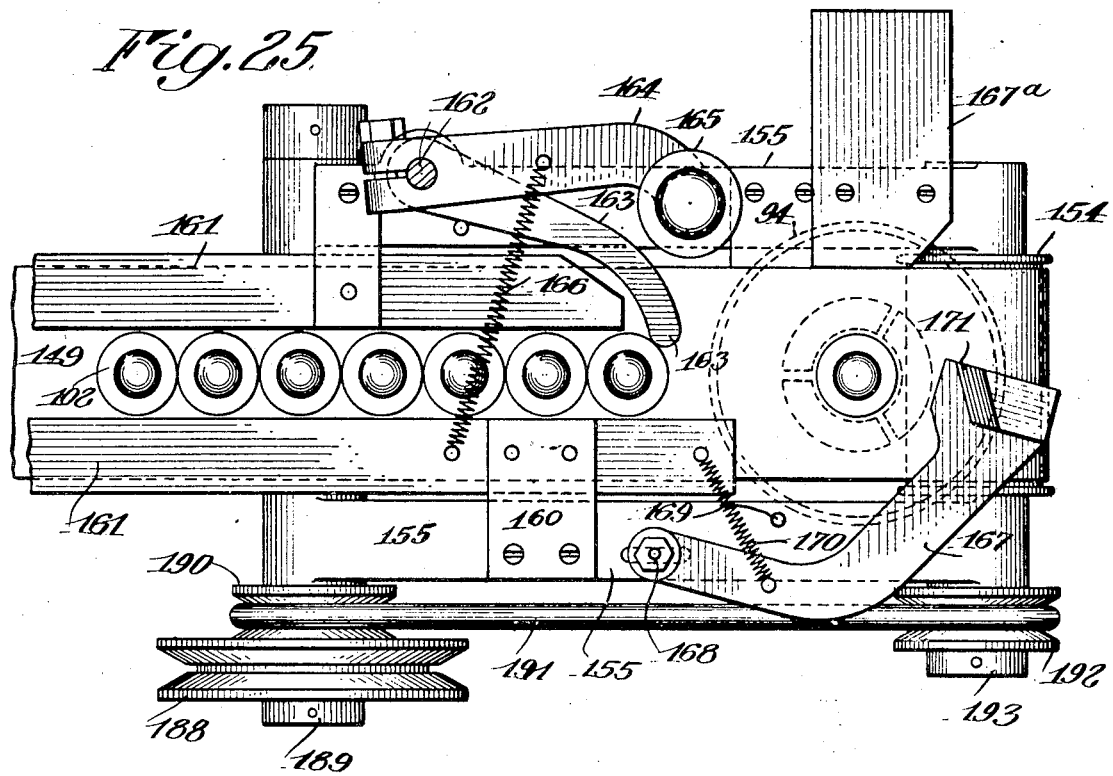
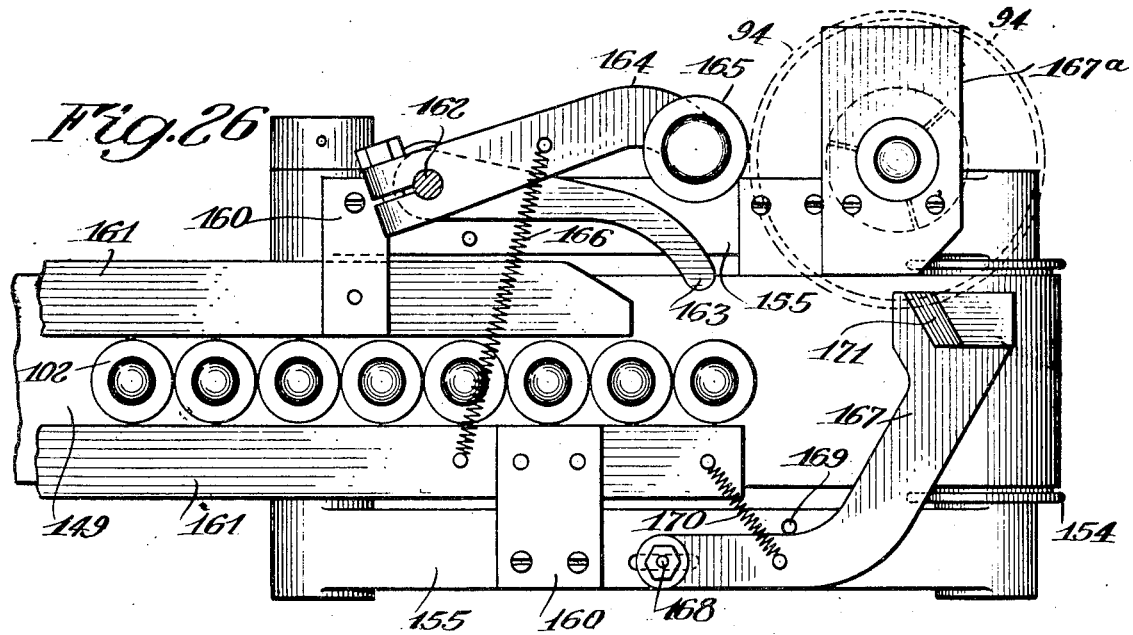

Patented Dec. 6, 1927.

1,651,902

UNITED STATES PATENT OFFICE.

THEODORE E. PENNOCK, OF ROCHESTER, NEW YORK, ASSIGNOR TO STANDARD AUTOMATIC MACHINE COMPANY, OF ROCHESTER, NEW YORK, A CORPORATION OF NEW YORK.

MACHINE FOR APPLYING CLOSURES TO CONTAINERS.

Application filed March 7, 1921. Serial No. 450,187.

This invention has to do with machines for applying closures to containers, and relates more particularly to machines for automatically applying caps or other closures to bottles, cans, and similar containers, one object of the invention being to provide an efficient machine of the above type which is practical in construction, and automatic, rapid and reliable in operation. Another object is to provide such a machine having means for receiving and feeding the closures and containers and for applying and securing the closures on the containers in an automatic manner eliminating hand operations. A further object is to provide a machine of this variety capable of adjustment to adapt it to accommodate containers and closures of various dimensions, and to apply the closures with varying degrees of force. To these and other ends the invention consists in certain improvements and combinations of parts, all as will be hereinafter more fully described, the novel features being pointed out in the claims at the end of the specification.

In the drawings:

Figure 4 is an enlarged top plan view with the feeding means and other parts omitted.

Figure 5 is a sectional plan view substantially on the line $5^a$—$5^a$ of Figure 3, illustrating parts of the closure applying mechanism.

Figure 6 is a similar view substantially on the line $6^a$—$6^a$ of Figure 2, illustrating the container supporting means and associated parts.

Figure 7 is a similar view substantially on the line $7^a$—$7^a$ of Figure 2, illustrating the actuating mechanism.

Figure 8 is a sectional plan view substantially on the line $8^a$—$8^a$ of Figure 2, showing means for adjusting the machine for different containers and closures.

Figure 9 is a fragmentary sectional elevation substantially on the line $9^a$—$9^a$ of Figure 7.

Figure 10 is a fragmentary sectional elevation substantially on the line $10^a$—$10^a$ of Figure 8.

Figure 11 is a similar view on the line $11^a$—$11^a$ of Figure 7.

Figure 12 is a side elevation of a portion of the container feeding means and container support.

Figure 13 is a top plan view of a portion of the container support, showing one of the container positioning and holding members.

Figure 14 is a section on the line $14^a$—$14^a$ of Figure 13.

Figure 15 is a plan view partly in section of a portion of the container clamping means Figure 16 is a section through the closure feeding means on the line $16^a$—$16^a$ of Figure 2.

Figure 17 is a section on the line $17^a$—$17^a$ of Figure 18.

Figure 18 is a central sectional elevation of one of the closure chucks, shown in initial operating relation to a container.

Figures 19, 20 and 21 are elevational views of the same part, showing the latter in different successive positions of operation relative to a container and illustrating also the closure adjusting or registering device.

Figure 22 is a top plan view of a modified form of the machine.

Figure 23 is an elevation of one of the chuck spindles and associated parts employed in the modified form of machine shown in Figure 22.

Figure 1:
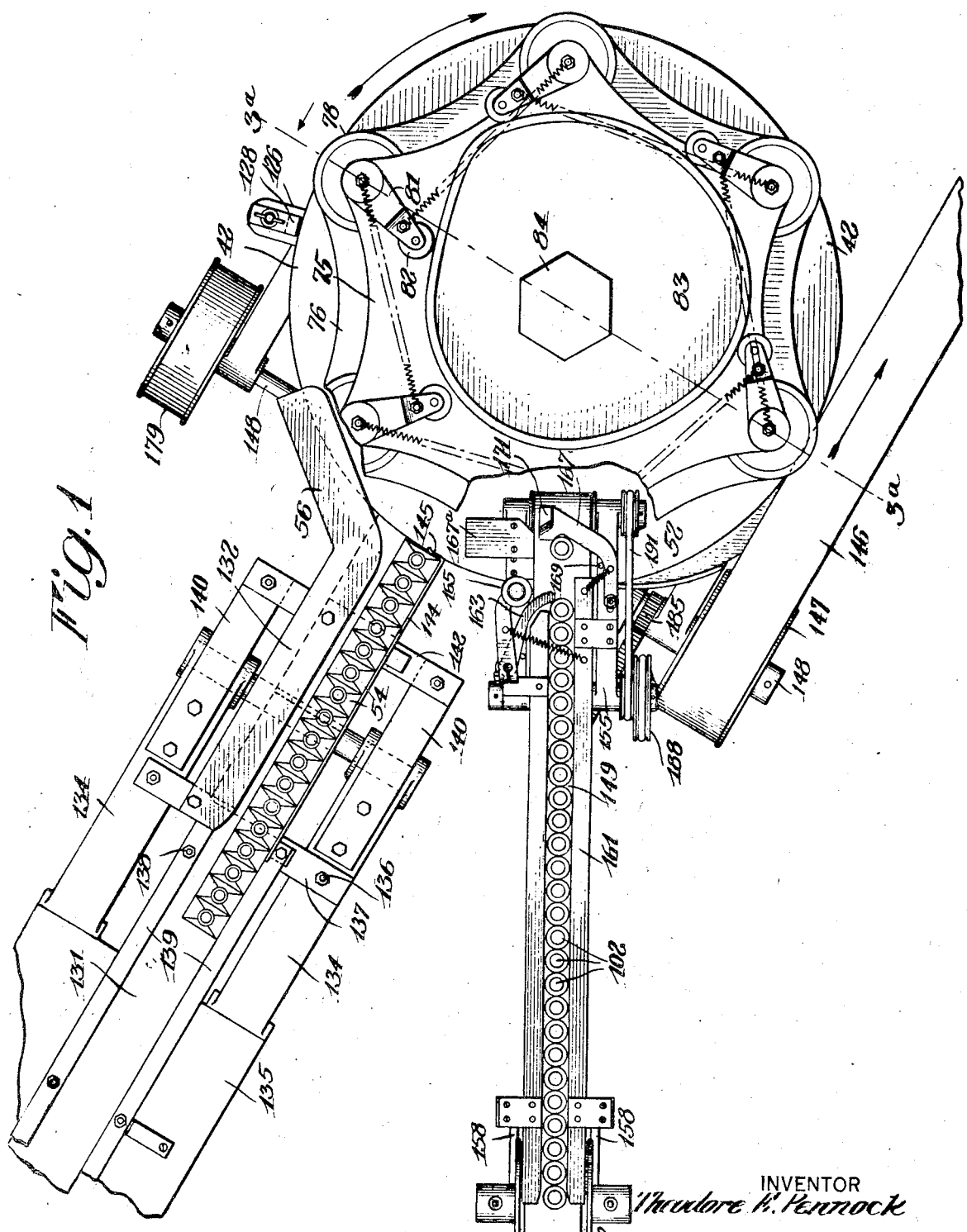
Figure 1 is a top plan view of a closure applying machine embodying the present invention.

Figure $23^a$ is a sectional view of the same.

Figure 24 is a sectional elevation of one of the closure chucks showing also the closure and container for which the modified form of machine shown in Figure 22 is adapted.

Figures 25 and 26 are top plan views of the closure feeding means employed with both modifications of the machine, with the parts in different positions.

Similar reference characters throughout the several views indicate the same parts.

The present embodiment of the invention is herein disclosed primarily by way of illustration of the principles involved and a preferred practical application of the same, and is capable, of course, of various modifications in the details of construction and operation within the scope of the claims. Generally speaking, this embodiment comprises a stationary base or standard adjustably supporting a column, with a rotatable frame having a lower portion carried by the standard and an upper portion carried by the column. The lower frame portion is provided with means for feeding containers to and from the same with operative parts for taking the containers from the feeding means, carrying them through a portion of a revolution of the frame, while having the closures applied, and subsequently discharging them again to the feeding means. The upper frame portion is provided with closure feeding means and with closure applying mechanism which operates to engage the closures and apply and screw them on the containers, this frame portion being adjustable toward and from the lower frame portion by the adjustment of the column, to adapt the machine to accommodate containers and closures of various dimensions. The present machine is primarily adapted to handle containers having a rectangular body portion and a cap closure secured thereon by means of either an interrupted or a continuous form of thread, but the machine is not limited in its application, of course, to these details.

Figure 2:
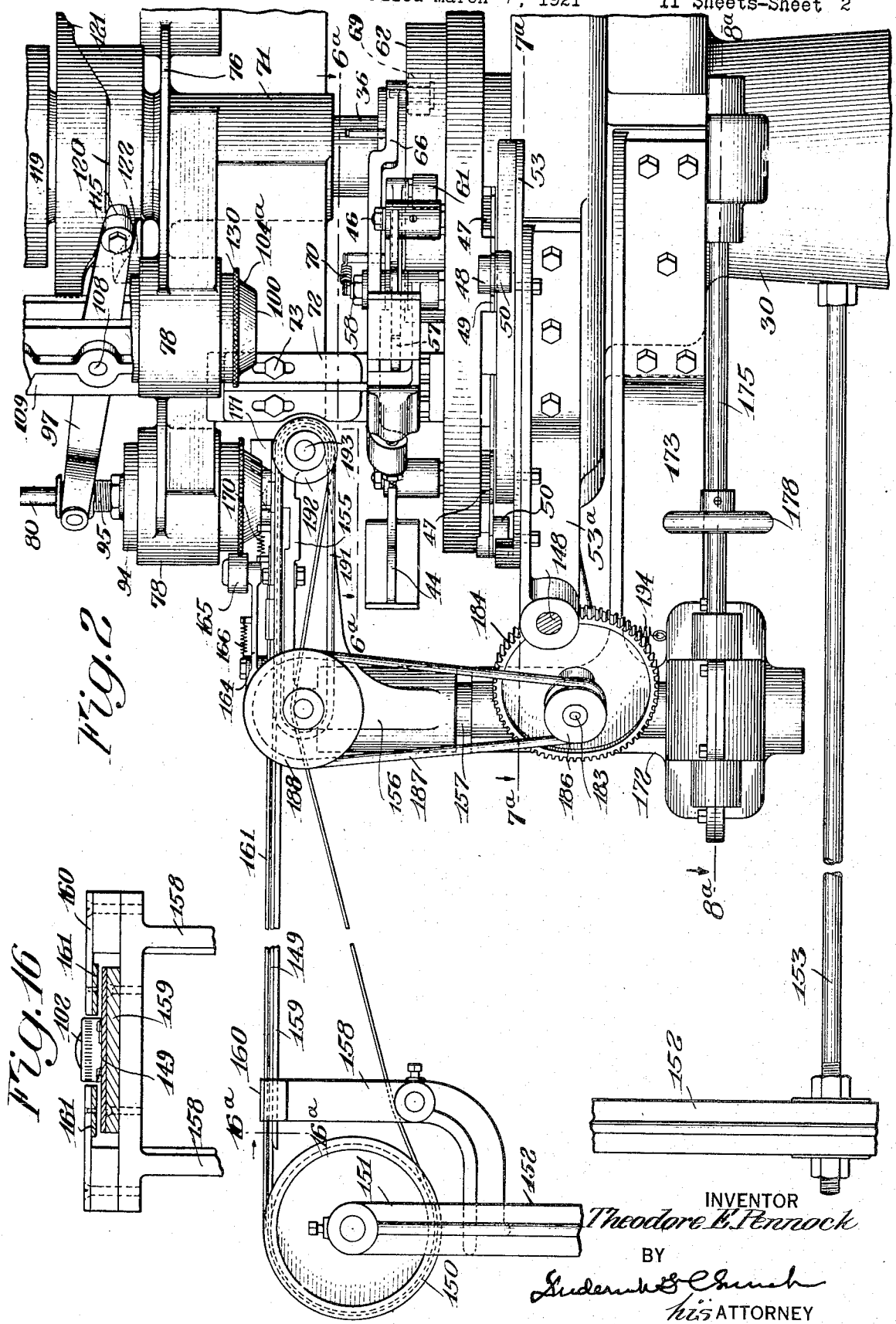
Figure 2 is an enlarged side elevation of the same, partly broken away.
Figure 3:
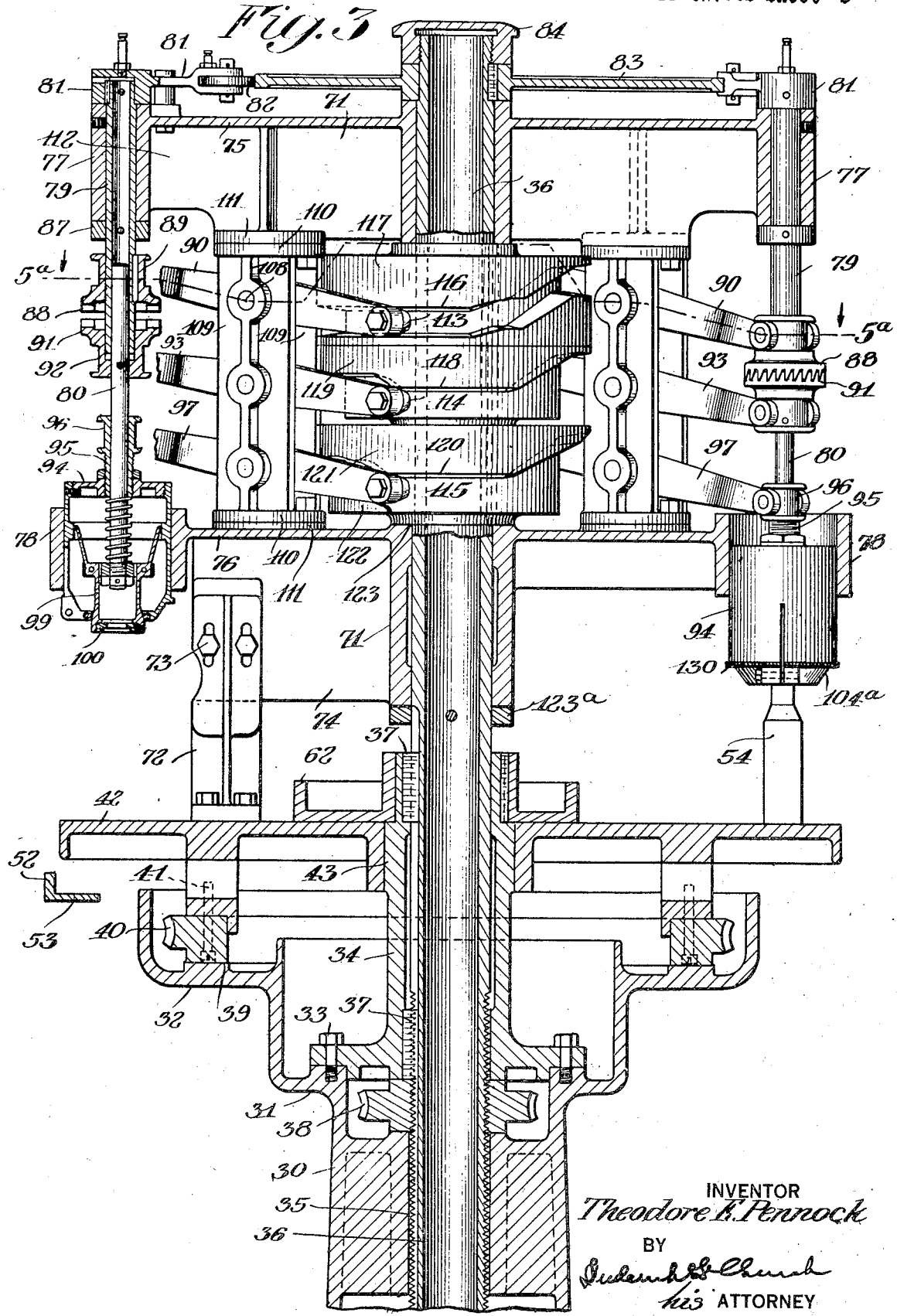
Figure 3 is an enlarged central sectional elevation substantially on the line $3^a$—$3^a$ of Figure 1.

Referring to the drawings for a more detailed description, and first to Figures 2 and 3, there is shown at 30 a stationary base or standard formed with stepped, outwardly extending flange portions 31 and 32. On the lower flanged portion 31 there is secured, as by means of bolts 33, a standard extension 34 in which and in the main standard portion is formed a bearing opening 35 for a vertically extending column 36. The latter slides vertically in the standard, being splined thereto, as at 37, to prevent rotation, and its lower end is provided externally with a screw threaded portion. Threadedly engaging the latter portion of the column and carried in a chamber in the standard between opposed bearing surfaces of the latter is a worm gear 38 by the rotation of which, through means presently to be described, the column is vertically adjusted in the standard. The upper flange portion 32 of the standard has formed thereon an annular bearing surface 39, rotatably supporting a worm gear 40 in the form of an annulus to which is fixed, as by means of bolts 41, a circular container support or table 42, the latter surrounding at its center and engaging a bearing surface 43 on the standard extension 34.

The means for positioning and holding the container on the support 42 comprises, preferably, a plurality of members or arms 44, Figures 6, 13 and 14, of which in the present instance there are six. Each of these members is formed with an L-shaped container engaging surface comprising the sides $45^a$ and $45^b$ and each member is fixed on a spindle 46 rotatably carried in support 42 and projecting through the under side of the latter where the spindle has fixed thereon a pinion 47 meshing with a rack 48 supported by a plate 49 carried by the under side of the support. Each rack 48 carries adjacent its outer end a roller 50 projecting downwardly through a slot in plate 49 in position to engage during the rotation of the support or table, with opposed stationary cam surfaces 51 and 52, Figure 6, projecting upwardly from a plate 53 fixed on the upper side of a bracket arm $53^a$ bolted on the standard, Figure 2. As hereafter described, the container feeding means comprises a pair of belts substantially level with the surface of the support, one of which carries the containers to a point adjacent the periphery of the latter, Figure 6, while the other, 146, extends tangentially of another portion of the support and moves in a direction to carry the containers away from the same. It is therefore apparent from the above description that as the container support is rotated, each member 44 is swung forwardly on its pivot by engagement of its roller 50 with cam surface 52 to a position in which the container engaging surface $45^a$ is radial of the support, and member 44 strikes a pin $53^b$ on the support. The member is brought to this position just prior to reaching the point at which the containers are fed to the periphery of the support and its radially extending surface $45^a$ engages the foremost container 54, sweeping the same transversely off the feeding means and against a cam surface or guide 55 inclined inwardly of the support so that the container is transferred from the feeding means to the support and moved inwardly of the latter along the surface $45^a$ into engagement with the angularly extending surface $45^b$, finally resting in operating position in the angle between these surfaces. The container thus placed in operating position, is carried around by the support through a partial rotation of the latter, during which movement the closure is applied by mechanism hereinafter described, after which the roller 50 of member 44 engages the other cam surface 51 of plate 53 and the holding member is thereby swung rearwardly on its pivot so that its surface $45^b$ sweeps the container off of the support and transfers it to the feeding means or conveyor 146 at the point of tangency of the latter with the support, so that the container is carried away for subsequent disposition. During this discharging movement each member 44 is swung rearwardly until its surface $45^a$ is substantially parallel with the feeding means to permit the latter to carry off the container, after which the member is swung forwardly again by the opposed cam surface 52 to take another container from the feeding means, as already described.

The means for centering and retaining the holding member 44 with the container in operating position comprises, preferably in addition to the stop pin 53ᵇ, a lever 57 for each member pivotally supported on a stud 58 rising from the support, the lever having a hooked end 59 for engagement with a recess 60 of member 44. Lever 57 carries on the other side of its pivot a roller 61 arranged to engage with the outer surface of a stationary cam 62 carried by and keyed to the extension 34 of the standard above the support. A spring 63 urges the hooked end 59 of the lever toward holding member 44 and the roller 61 toward the cam, and the latter is so formed that the lever is allowed to engage, center and hold the member 44 in place as soon as the container reaches its operating position. Lever 57 remains in this relation until just prior to the discharging movement of the holding member when the cam moves the lever out of engagement with the member until the latter is returned to operating position with another container in the manner described.

The means for clamping the container in operating position on the holding member 44 comprises preferably an arm 64 pivotally supported on stud 58 and having a hooked end 65 for engaging the container. Arm 64 is moved to and from clamping position by a lever 66 also pivoted on stud 58 and connected by the bolt 67 and spring 68 with the arm, as shown in Figure 15, so that movement of lever 66 serves to move arm 64 in a yielding or resilient manner toward the container by compressing spring 68 to accommodate irregularities in the sizes of the containers, while the clamping arm is moved away from the container in a positive manner through the action of bolt 67. Lever 66 has at its other end beyond the pivotal point a roller 69 arranged to engage the inner surface of stationary cam 62 and the latter is so shaped that during rotation of the support the above described clamping means is moved into clamping engagement with the container when the latter reaches operating position and continues in such relation until just prior to the discharging movement of member 44, when the container is released, this operation being repeated at each rotation of the support. A spring 70 connected to lever 66 and to stud 58 maintains roller 69 in engagement with the cam surface.

The capping mechanism is carried by an upper frame portion indicated generally at 71, Figure 3, which has bearing portions rotatably supporting it on the adjustable column 36. This upper frame portion and the lower frame portion, or container support, rotate synchronously with each other and after adjustment of the position of the upper frame portion by means hereafter described, the two frame portions are clamped together by means of an upwardly extending bracket 72 fixed on the container support and having adjacent its upper end a plurality of slots through which pass bolts 73 for adjustably clamping the bracket to a web extension 74 of the upper frame portion. The upper and lower frame portions are thus rigidly secured to each other for rotation together as a whole. The upper frame portion comprises upper and lower horizontal walls or flanges 75 and 76, respectively, on which are carried a plurality of pairs of vertically alined bearings 77 and 78, respectively. In the present instance there are six such pairs of bearings and the upper one of each pair rotatably carries a sleeve 79 which extends below the bearing and has rotatably and slidably engaged in its lower end a member or spindle 80 carrying the closure engaging device or chuck. Sleeve 79 also projects above bearing 77 and has fixed thereon an arm 81 carrying a roller 82 for engagement with the surface of a stationary cam 83 keyed on the upper end of the column 36 and secured in place by a finishing cap 84 for the column. A spring 85, secured to arm 81 and to a stud on the axis of an adjacent arm, urges roller 82 toward the cam and arm 81 toward the end of a set screw 86 carried by the frame. By the adjustment of screw 86 the extent of cooperation of the roller with the cam may be limited, so that arm 81 is rotated by the high portion of the cam through an adjustable angle for giving to sleeve 79 an adjustable degree of rotation to rotate the chuck. A collar 87 fixed on the sleeve below bearing 77 prevents upward movement of the sleeve in its bearing. Splined on the lower end of sleeve 79 is a sliding clutch sleeve 88 formed at its bottom with a clutch face and at its top with a circumferential groove 89 with which engages the forked end of a lever 90 pivotally carried by the frame. Fixed on spindle 80 adjacent the lower end of sleeve 79 is a complementary clutch part 91 with a circumferential groove 92 with which engages the forked end of a lever 93 pivoted on the frame. At 94 is a cylindrical member or chuck housing having a sleeve 95 slidable on spindle 80 and provided with a circumferential groove 96 with which engages a forked end of a lever 97 also pivotally carried by the frame, levers 90, 93 and 97 being actuated by means and in a manner which will presently appear. Fixed on the lower end of spindle 80 within housing 94 is a spider 98 having a plurality of pairs of spaced lugs between each pair of which is pivotally supported a finger 99 carrying at its lower end a chuck jaw 100. The latter are in the present instance in the form of sectors of a circle and provided with an angular seat 101 adapting them to grip the top and periphery of a closure or cap. In the present application of the machine the closure is of the circular cap shape shown at 102, but of course various other shapes of closures may be handled by the chuck by correspondingly shaping its jaws. Each finger 99 has on its outer side an inclined cam surface 103 with which is adapted to cooperate a collar 104 carried at the lower end of a cone shaped portion on the bottom of the chuck housing. Each finger 99 is extended above its pivot to provide a resilient portion 105 inclined outwardly into the path of movement of a shoulder 106 on the housing, these parts being so constructed and arranged that when the housing is lowered, relative to the chuck collar 104, engaging the cam surfaces 103 of the fingers, forces the jaws 100 inwardly to grip a closure, and when the housing is raised, relative to the chuck, the shoulder 106 pressing on the finger portions 105, maintains the fingers in engagement with collar 104 and opens the jaws to release the cap as soon as the collar has passed upwardly above the cam surfaces 103, so that raising or lowering the housing relative to the chuck opens and closes the jaws of the latter to release or grip a closure. A spring 107 coiled about the spindle, bears at its lower end against the chuck spider 98 and at its upper end against the top of the housing thus tending to maintain the latter in raised position relative to the chuck with the jaws of the latter open.

Levers 90, 93 and 97 are each pivotally supported as at 108 between a pair of parallel vertical plates 109 secured at their tops and bottoms to flanges 110 bolted in turn to corresponding flanges 111, one carried by the web wall 112 extending downwardly from the upper horizontal wall at platform 75, and the other carried by the lower horizontal wall 76. Levers 90, 93 and 97 carry at their opposite ends rollers 113, 114 and 115, respectively, the first of which rollers engages in a slot in a cam 116, fixed on the stationary column 36. This cam thus positively actuates the lever 90 to actuate the clutch sleeve 88 of sleeve 79 to and from engagement with the clutch part carried by the spindle for intermittently clutching the sleeve to the spindle for rotating the latter during the rotation of the sleeve and for subsequently releasing the spindle.

Roller 114 of lever 93 engages from below the surface 118 of a stationary cam 119 fixed on the column. This cam is shaped to operate or raise and lower spindle 80 to obtain a closure from the feeding means and apply the same to the container as will more clearly appear hereafter. The weight of the spindle and associated parts is sufficient to maintain the roller in contact with its cam surface although other means to this end may be provided if desired. Roller 115 of the lever 97 which actuates the chuck housing engages from below the surface 120 of a stationary part or cam 121 fixed on the column, the weight of the housing and associated parts serving to maintain the roller on the cam surface 120 except at the portion of the cam which actuates the housing to force the chuck jaws into gripping engagement with the closure, where the cam has an opposed surface 122 for positively effecting such action. This cam surface 122 is provided at a portion only of the periphery of the cam, as shown in Figure 3, for compressing spring 107, Figure 24 and initially positively forcing collar 104 down the inclined cam surfaces 103 of the chuck fingers or jaws to actuate the latter to grip a closure. Beyond this point the cam surface 122 is discontinued and the friction between the collar 104 and chuck fingers is sufficient, when a closure is presented to and engaged by the jaws, to hold the parts in such closure gripping position. Should no cap be supplied to the chuck, however, for any reason, such frictional binding of the parts does not occur and spring 107 immediately raises the chuck housing 94 and collar 104 when the roller 115 reaches the end of cam surface 122, the roller riding away from cam surface 120. This provides for opening the chuck jaws immediately if no closure is gripped by the chuck so that the jaws cannot come into destructive engagement with the container top as might otherwise be the case when the chuck is lowered for placing a closure on the container. The column 36 is formed at 123 with an external shoulder supporting cam 121 and the cams 117 and 119 superposed thereon, and the upper wall or flange 75 is supported on the uppermost cam and supports the lower wall or flange 76 through the connecting plates 109. A collar 123ª on column 36 also supports the bearing sleeve of flange 76, so that the upper frame portion is supported against downward movement on the column while the bracket connection 72 with the container support is being adjusted. It is apparent from the above description that as the frame is rotated, rollers 113, 114 and 115, cooperating with the stationary cam surfaces, control the rotation of spindle 80, through the clutch connection with sleeve 79, and also its vertical movement and the operation of the clutch jaws, and the parts are arranged and designed to properly coordinate these movements so that the chuck first descends toward the feeding means with its jaws open, engages and grips a closure, lowers the latter into engagement with the container and subsequently rotates the same to screw and secure the closure in place, after which the chuck is operated to release the closure and is raised ready for a repetition of the operation.

In its present application the machine is adapted to apply cap closures having an interrupted thread engagement with the container, as illustrated in Figures 18 to 21 inclusive. In this form of securing means, as well known in the art, the container neck is provided with spaced lugs 124 having an inclined or spiral lower surface, and the cap carries lugs 125 of corresponding shape for engagement with the container lugs so that the lugs of the cap may be lowered on the container neck between the lugs of the latter and then rotated to bring the respective lugs into securing engagement with each other by partial rotation of the cap. With this form of securing connection the cap may at times be brought down out of registry with the container, or in other words, with its lugs 125 over the lugs 124 on the container as in Figure 19, instead of opposite the intervals between the latter, which interferes with the securing operation of the machine, and it is desirable to provide means for automatically insuring proper preliminary or initial registry of the cap and container. To this end there is preferably provided on the standard of the machine a stationary stud 126 having a reduced upper end 127 on which is adjustably carried a finger 128 having a slot embracing the reduced portion of the stud, and a nut 129 for locking the finger in adjusted position. This finger is located at a point in the path of rotation of the frame where the closure has been lowered into engagement with the container but before the securing rotation of the closure occurs, and the finger 128 may be adjusted to project into the path of movement of a knurled flange 130 on the chuck housing so as to give the same and spindle 80 with the chuck and closure a slight rotary movement sufficient to cause the lug of the closure to register with the intervals between the lugs of the container, when the closure descends and is properly seated ready for the securing rotary movement. It is to be noted that when the closure happens to register with the container when it first descends into engagement therewith, the full seating of the cap allows the parts to descend far enough to carry the flange 130 below finger 128 so that the latter is not engaged. The finger, therefore, merely engages such caps as have not been properly registered and fully seated in the first instance, and adjusts or rotates such caps far enough to effect registry.

The means for feeding the containers toward the container support comprises preferably a conveyor or belt 131 which passes at one end over a pulley 132 journaled at 133 in spaced brackets 134 on the main frame 135 of the conveyor the other end of which is supported and driven in any suitable known manner. Supported on brackets 134 are studs 136 carrying cross bars 137 from which in turn rise studs 138 supporting guide rails 139 for maintaining the containers on the conveyor. Fixed on the brackets also are extension plates 140 having studs 141 which in turn support the cross bar 142 serving to support a terminal platform 143 for the feeding means. This platform is arranged in continuation of the conveyor and extends on a level with and adjacent the container support or table 42, so that containers carried by the conveyor pass on to platform 143 and crowd each other along the same toward the container support. The guide plate 56 previously described is extended over the conveyor so as to direct the containers toward a guide rail 144 on the opposite side of the conveyor having an angular retaining end 145 at the end of the platform adjacent the container support. The containers thus move along the platform in compact relation until the foremost container engages the retainer 145 by which it is stopped and held in position for engagement by one of the container positioning and holding members 44 of the container support during the rotation of the latter.

The container feeding means comprises also a conveyor or belt 146 passing at one end over a pulley 147 rotating freely on the main driving shaft 148 of the machine which is supported in suitable bearings on the standard as hereafter described. Conveyor 146 has one side thereof substantially level with and tangent to the container support at a point in the path of rotation of the latter sufficiently removed from the conveyor 131 to permit the containers to be rotated with the support through a part of a revolution sufficient for accomplishing the capping operation. And as previously described, each container when adjacent the point of tangency of the support with conveyor 146 is transferred to the latter and carried away from the machine. Conveyor 146 is otherwise supported and driven in any suitable manner.

The means for feeding closures to the machine comprises preferably a conveyor or belt 149, Figures 1, 2, 16, 25 and 26, passing at one end over a pulley 150 journalled in the forked upper end 151 of an auxiliary frame 152 resting on the ground and also supported by a spacing arm 153 carried by the standard. The conveyor passes at its other end over a pulley 154 journaled in spaced arms 155 extending under the path of movement of the capping mechanism and supported on a frame or head 156 fixed on the upper end of a vertical spindle 157 which is adjustably supported at its lower end by means presently to be described. Frame 152 carries a bracket 158 on which is sustained one end of a conveyor support 159, the other end of which is carried by head 156 and arms 155. Supported on bracket 158 also and on arms 155 are plates 160 holding guide rails 161 extending over the conveyor and so spaced from each other as to guide the caps for movement in alinement with each other toward the capping mechanism, it being understood that the conveyor is extended so as to pass under the cap engaging devices or chucks at a point in the path of rotation of the same in advance of the point at which containers are fed to the support 42. Rotatably supported in the head 156 is a spindle 162 on which is fixed an arm 163 extending across the end of the adjacent guideway 161 into the path of movement of the caps to arrest the latter. Fixed on spindle 162 also is an actuating arm 164 carrying the roller 165 normally lying in the path of movement of the chuck housings during the rotation of the frame, to which position the roller is urged by a spring 166. These parts are so shaped and arranged that as each chuck housing rotates past the feeding means and into engagement with roller 165, arm 163 is swung for an instant out of the path of movement of the caps, after which it is released by the continued movement of the chuck housing and arm 163 is returned into the path of movement of the chucks in such timed relation that but one cap escapes the arm. The released cap, carried forward by the conveyor, comes into engagement with an angular arm 167 pivotally supported at 168 on one of the brackets 155, the arm being normally held across the path of movement of the cap and against a stop 169 by spring 170. The arm is formed at its end with an upwardly projecting cam portion 171 so shaped that as a chuck housing rotates with the frame and descends toward the conveyor to obtain a cap, it engages cam 171 and swings arm 167 out of the way of the chuck jaws, as illustrated in Figure 25, so that the open jaws descend upon the cap previously held by arm 167 without interference by the latter. At this point the chuck jaws grip the cap and sweep the same off the conveyor over an extension 167ª on one of the arms 155, as shown in Figure 26. As the chuck passes on, arm 167 is permitted to return to normal position in time to stop the next cap which is released at the same time by the chuck.

Means are provided for adjusting the end of the closure conveyor adjacent the machine, simultaneously with the adjustment of column 36 and the capping mechanism, to maintain the proper relative positions of the latter and its feeding means. To this end spindle 157 carrying this end of the closure feeding means projects at its lower end into a bearing in housing 172 carried by the bracket 173 on the standard, and is supported by threaded engagement with a worm gear 174 carried in a chamber in the housing between opposed bearing surfaces on the latter. The spindle is splined to the housing as shown in Figure 10 so that while vertically movable therein it is held against rotation. A shaft 175 is journaled at its ends in housing 172 and in the main standard and has fixed thereon worms 176 and 177 meshing with gears 38 and 174, respectively. Shaft 175 is rotated by the hand wheel 178, thus providing a common means for simultaneously adjusting column 36 and spindle 157, so that the capping mechanism and its feeding means are automatically maintained in proper relation with each other while being vertically adjusted to accommodate containers and closures of different dimensions.

The actuating means for the machine comprises a pulley 179, Figure 7, or other suitable power applying means, fixed on the main drive shaft 148 previously described, which shaft is rotatably carried in bearings 180 on the standard. The shaft has fixed thereon, in a space within the standard, a worm 181 meshing with gear 40 which, as previously described, rotates the frame comprising the container support and the capping mechanism. Pivotally carried on shaft 148 is an arm 182 carrying at its outer end a spindle 183 on which rotates a gear 184 meshing with a pinion 185 fixed on the main shaft. Gear 184 rotates a grooved pulley 186 on the same spindle which is connected by means of a belt 187 with a similar pulley 188 rotatably carried by a spindle 189 on the head 156. Pulley 188 has fixed thereto a similar pulley 190 connected by means of a belt 191 with a pulley 192 fixed on a shaft 193 rotating in bearings in the bracket arms 155 and having fixed thereon a pulley 154 which drives the conveyor belt 149. A spring 194, Figure 11, urges arm 182 downwardly about its pivotal support on the main shaft to maintain proper driving tension in the belt 187 during the adjustment of the machine.

The modification of the construction shown in Figures 22, 23, 23ª and 24, illustrates the adaptation of the machine for handling a closure attached in a somewhat different manner to the container neck, namely, by means of a continuous form of thread as shown in Figure 24, which may be of the single or multiple variety. In this case it is desirable to rotate the closure and container relative to each other to an extent sufficient to bring the threaded parts into initial engagement with each other and until the closure has been fully screwed onto the container, and it may therefore be desirable with this variety of a closure to provide for a greater extent of rotation of the latter than is practicable where the chuck spindle is rotated by means of a cam, as in the construction of parts previously described. Also, where the closure and container are brought together with the starting points of their threads in differing relative positions, they require differing degrees of relative rotation to engage the threads with each other and turn the closure home, and it is desirable under these circumstances to accomplish the rotation through a yieldable actuating connection to provide for yielding slippage of the actuating parts as soon as the closure is tightened home on the container. The force necessary to effect such slippage is preferably made adjustable to suitably vary the degree of tightness with which the closure is applied. To these ends therefore, a gear 195 is substituted for the cam 83 and fixed adjacent the upper end of column 136 and meshing with gear 195 are a plurality of pinions 196 carried in the upper ends of sleeves 197 rotating in the bearings 77 on the frame. Sliding longitudinally in each sleeve 197, but splined thereto for rotation therewith, is a sleeve 198 having at its lower end a flange 199 forming one part of a yieldable frictional clutch, sleeve 198 being provided also with an annular groove 200 with which engages the outer end of lever 90 as in the preferred construction. Carried within sleeve 198 is a smaller sleeve 201 extending below sleeve 198 and provided at its lower end with a flange forming a frictional clutch part complementary to the part 199, one or both of these parts being faced with leather or other suitable material 203. The upper end of sleeve 201 has threadedly engaged therewith a nut 204 rotatably fitting the bore of sleeve 198 and serving to space the latter and sleeve 201. Coiled about sleeve 201 within the space thus provided is a spring 205 bearing at its upper end against nut 204 and at its lower end against flange 199. It is apparent from this construction that spring 205 holds the clutch part 202 in yieldable frictional engagement with clutch part 199, and that the pressure between these clutch parts may be varied by the adjustment of nut 204 to provide for slippage between the same at different degrees of transmitted force. Clutch part 202 is formed on its lower face with clutch teeth 206 with which cooperate corresponding teeth 207 on clutch part 208 fixed on the chuck spindle 80, described in connection with the preferred form of the invention. This clutch part is provided with an annular groove 209 with which engages the outer end of the lever 93 already described for effecting vertical movement of spindle 80 and the closure chuck. These parts are actuated and function as already described in connection with the first form of the invention except for the yieldable connection afforded by the frictional clutch parts 199 and 202 which provide for slippage in the driving connection each required during the time in which the positive clutch parts 202 and 208 are engaged. In this form of invention sleeve 198 and clutch parts 199 and 202 are constantly rotated, except for the occasional slippage referred to, and clutch parts 202 and 208 are engaged to rotate the chuck at the proper times described and for a sufficient period at each time to provide for fully screwing the closure home on the container whatever their relative positions at the time of engagement. The closure is thus turned as far as may be necessary to engage its threads with those of the container and to fully turn it home on the latter. When the closure tightens however, clutch parts 199 and 202 provide for slippage of driving connection in case the positive clutch parts 202 and 208 continue in engagement for a longer time, and by adjusting nut 204 the degree of force applied to the closure to tighten it on the container may be suitably varied as desired, so that while the closure is securely tightened in place the danger of breakage of the articles is provided against. This species or modification is described and claimed in my divisional application Serial No. 450,188, filed March 7, 1921, for machines for applying closures to containers.

The operation of the machine has been indicated in connection with the description of its construction, and, as indicated, when the machine is connected to a suitable source of power, the main frame carrying the container support or table and the capping mechanism is continuously rotated, while the closure feeding means is driven by the connections with the main shaft described, the container feeding means or conveyor being driven by any suitable known means. With the capping mechanism and its closure feeding means adjusted to suit the dimensions of the containers and closures to be handled, the latter are supplied to their respective feeding means, operating as described. Each closure chuck, approaching its feeding means, descends with open jaws which close to grip and carry along a closure. Meanwhile the corresponding container positioning and holding member 44 sweeps a container from the feeding means and locates and clamps the same, in cooperation with part 64, in operating position on the container support. The chuck then descends and brings the closure into engagement with the container at which time the adjusting or registering finger 128 adjusts such closures as have not properly registered and become seated on the container, after which the clutch parts 88 and 91 are engaged and the chucks are rotated through the proper angle to secure them on the container. In the modification of Figures 22, 23, 23ª and 24, the adjusting finger 128 may, of course, be dispensed with. When this is accomplished the clutch parts are first disengaged, each chuck is then opened to release the closure and rises out of engagement therewith, and it is to be noted that the opening and closing of the clutch parts provides for the initial gripping and also the release of the closure by the chucks while the latter is not in rotation, which is important in preventing scoring of the closure. The container is then unclamped and the holding member 44 actuated to discharge the same with cap affixed to the conveyor 146 which moves it on to be labeled, packed, or otherwise disposed of. The container holding parts are readily adaptable to various sizes and shapes of containers and the closure chucks likewise are easily adapted to a variety of closures. The capping mechanism and its feeding means are quickly and conveniently adjusted by a common means to adapt the machine to accommodate various styles of containers and closures. The machine is compact, practical and reliable in construction and automatic and rapid in operation, and provides an efficient and economical means for accomplishing the purposes desired.

I claim as my invention:

1. A machine for applying closures to containers comprising rotary supporting means arranged to hold a plurality of containers, a plurality of rotary closure engaging devices each having relatively movable parts for gripping and carrying the closure, operating means effecting relative movement of said supporting means and closure engaging devices toward and from each other to bring the containers and closures together, actuating means having a coordinating connection with said operating means for closing said parts to grip and hold a closure and for subsequently opening said parts to release the closure after the latter is applied independently of thrust or pull on the closure or container and actuating means for effecting rotation of said devices for securing the closures on the containers.

2. A machine for applying closures to containers comprising a rotary frame provided with means for holding a plurality of containers in spaced relation, means for feeding containers and closures in separated relation into the machine, a plurality of closure mechanisms on said frame each provided with a roatry closure engaging device having relatively movable parts for gripping a closure supplied by said feeding means, operating means effecting relative movement of corresponding pairs of container holding means and closure engaging devices, and actuating means for rotating said closure engaging devices to screw the closures on the containers and for rotating said frame.

3. A machine for applying closures to containers comprising a rotary frame provided with means for holding a plurality of containers, a plurality of closure applying mechanisms on said frame, feeding means for automatically supplying closures to said mechanisms, each of said mechanisms being provided with a device having movable parts adapted to grip and carry a closure, actuating means for said movable parts, operating means effecting relative movement of said container holding means and devices to bring the containers and closures together, and actuating means for effecting relative rotation of said container holding means and devices for screwing the closures on the containers and for rotating said frame.

4. A machine for applying screw closures to containers comprising a rotary frame provided with means adapted for holding a plurality of filled containers in upright position, a plurality of closure applying mechanisms rotating with said frame and each provided with a closure engaging device, feeding means for automatically supplying closures to said devices, feeding means for moving containers to and away from said holding means, operating means effecting relative movement of said container holding means and devices to bring the containers and closures together, and actuating means effecting relative rotation between said container holding means and closure engaging devices and between the containers and closures engaged thereby for screwing the closures on the containers.

5. A machine for applying closures to containers comprising a rotary frame provided with means for holding a plurality of containers, a plurality of closure applying mechanisms on said frame each provided with a rotary chuck having movable jaws adapted to grip and carry a closure, actuating means for said chuck jaws, feeding means for automatically supplying closures to said chucks, feeding means for moving containers to and away from said holding means, operating means effecting relative movement of said holding means and chucks to bring the containers and closures together, and actuating means for rotating said chucks to screw the closures on the containers and for rotating said frame.

6. A machine for applying screw closures to containers comprising a rotary frame provided with means for holding a plurality of containers, a plurality of closure applying mechanisms on said frame each provided with a rotary chuck having relatively movable jaws for gripping and carrying a closure, feeding means for automatically supplying closures to said chucks, means for feeding containers into the machine in separated relation to said closures, operating means effecting relative movement of said holding means and chucks to bring the containers and closures together, and actuating means for rotating said chucks for screwing the closures on the containers and for rotating said frame.

7. A machine for applying screw closures to containers comprising a rotary support provided with means for holding a plurality of containers in spaced relation with their filling openings uppermost, a plurality of closure applying mechanisms on said support each provided with a rotary chuck having movable jaws for gripping a closure, actuating means for said jaws, feeding means for supplying closures to said chucks, operating means effecting movement of said chucks toward and from said holding means, and actuating means for rotating said chucks to screw the closures on the containers and for rotating said support.

8. A machine for applying closures to containers comprising a support provided with means for holding a container, a closure applying mechanism having a closure holding device, operating means effecting relative movement of said container holding means and closure holding device toward each other to bring the container and closure together, an adjusting device for shifting the relative positions of said parts to bring the container and closure into preliminary registry, and actuating means effecting additional relative movement of said parts to secure the closure on the container.

9. A machine for applying closures to containers comprising a support provided with means for holding a container, a closure applying mechanism having a yieldable closure holding device, operating means effecting relative movement of said container holding means and closure holding device toward each other to bring the container and closure into yielding engagement, an adjusting device for effecting relative rotation between said container holding means and closure holding device to bring the container and closure into preliminary registry, and actuating means effecting additional relative movement of said parts for securing the closure on the container.

10. A machine for applying screw closures to containers comprising a movable support, feeding means for supplying containers thereto, container positioning means including a member movable on said support adapted to transfer containers from said feeding means to operating position on said support, actuating means for said movable member, and a rotary closure applying mechanism movable with said support and provided with closure gripping means adapted for screwing a closure on the container.

11. A machine for applying closures to containers comprising a movable support, feeding means for supplying containers thereto, container positioning means including a member movable on said support adapted to transfer containers from said feeding means to operating position on said support, actuating means for said movable member, centering means for said movable member for insuring accurate positioning of the container, and closure applying mechanism movable with said support for securing a closure on the container.

12. A machine for applying closures to containers comprising a movable support, feeding means for supplying containers thereto, container positioning means including a member movable on said support adapted to transfer containers from said feeding means to operating position on said support, actuating means for said movable member, clamping means for holding the container immovable on said support, and closure applying mechanism movable with said support for securing a closure on the container.

13. A machine for applying closures to containers comprising a movable support, feeding means for supplying containers thereto, container positioning means including a member movable on said support adapted to transfer containers from said feeding means to operating position on said support, actuating means for said movable member, centering means for said movable member for insuring accurate positioning of the container, clamping means cooperating with said movable member for holding the container immovable on said support, and closure applying mechanism movable with said support for securing a closure on the container.

14. A machine for applying screw closures to containers comprising a movable support, container conveying means for moving containers to and away from said support, container positioning means including a member movable on said support adapted to transfer containers from said conveying means to operating position on said support and to discharge the same from the latter to said conveying means, actuating means for said movable member, closure feeding means and closure applying mechanism movable with said support and provided with closure gripping means adapted for screwing closures fed by said means on the containers.

15. A machine for applying screw closures to containers comprising a movable support, container conveying means, container positioning means including members movable on said support for transferring containers between said conveying means and support and for clamping the same in operating position on the latter, cam means for actuating said movable members, and closure applying mechanism provided with rotary closure gripping means adapted for rotating and screwing closures on the containers while on said support.

16. A machine for applying screw closures to containers comprising a movable support, container conveying means, container positioning means including stationary guide means and members movable on said support in cooperation with said guide means for transferring containers between said conveying means and support and for clamping the same in operating position on the latter, and closure applying mechanism provided with rotary closure gripping means adapted for rotating and screwing closures on the containers while on said support.

17. A machine for applying closures to containers comprising a movable support, container conveying means, stationary guide means, a member movable on said support for cooperation with said guide means to transfer containers from said conveying means to said support and for returning the same to said conveying means, yieldable means cooperating with said member for clamping a container in operating position on said support, cam means for actuating said movable member and said clamping means, and closure applying mechanism for securing a closure on the container while on said support.

18. A machine for applying screw closures to containers comprising a movable support, container conveying means, a plurality of members movable on said support for transferring containers between said conveying means and support and holding the same in a plurality of operating positions on the latter, cam means for actuating said movable members, and a plurality of rotary closure applying mechanisms movable with said support, one adjacent each operating position thereon, and each provided with closure gripping means adapted for rotating and screwing closures on said containers in succession while on said support.

19. A machine for applying closures to containers comprising a movable support, container conveying means, a plurality of members movable on said support for transferring containers between said conveying means and support and for holding the same in a plurality of operating positions on the latter, cam means for actuating said movable members, automatic closure feeding means, and a closure applying mechanism movable with said support adjacent each of said operating positions for transferring closures from said feeding means to the containers and securing the same thereon.

20. A machine for applying closures to containers comprising a movable support, container conveying means, a plurality of members movable on said support for transferring containers between said conveying means and support and for holding the same in a plurality of operating positions on the latter, automatic closure feeding means, mechanism movable with said support including a rotary chuck adjacent each operating position thereon for transferring closures from said feeding means to the containers and screwing the same thereon, and an adjusting device for effecting preliminary registry between each closure and container.

21. A machine for applying closures to containers comprising a rotary support, means for conveying containers to and from said support, a plurality of arms pivoted on the support for transferring containers from said conveying means to spaced operating positions on the support and from the latter to said conveying means, actuating means for said arms, container holding means on said support cooperating with said arms for holding the containers in said positions, stationary cam means adjacent the axis of said support for actuating said holding means, and closure applying mechanism rotating with said support including a closure engaging device for each of said operating positions for securing the closures on the containers.

22. A machine for applying closures to containers comprising a rotary support, means for conveying containers to and from said support, a plurality of arms pivoted on the support for transferring containers from said conveying means to spaced operating positions on the support and from the latter to said conveying means, actuating means for said arms, container holding means on said support cooperating with said arms for holding the containers in said positions, stationary cam means adjacent the axis of said support for actuating said holding means, closure feeding means, closure applying mechanism rotating with said support including a chuck for each of said operating positions, and means for actuating said chucks during each rotation of the support to grip a closure and secure it on a container.

23. A machine for applying closures to containers comprising a rotary frame having a support provided with means for holding a plurality of containers in spaced relation, closure feeding means stationarily positioned adjacent said frame, a closure engaging device on the frame adjacent each of said holding means provided with closure gripping jaws, operating means for moving each of said devices toward said feeding means and subsequently toward the corresponding container during each rotation of the frame to obtain and apply a closure, actuating means for rotating said devices to screw the closures on the containers, and means for actuating said jaws to grip and release the closures in coordination with said movements of the devices.

24. A machine for applying closures to containers comprising a rotary frame having a support provided with means for holding a plurality of containers in spaced relation, closure feeding means stationarily positioned adjacent said frame, a closure engaging device on the frame adjacent each of said holding means, cam means for actuating each of said devices for gripping a closure supplied by said feeding means and for applying the same to the corresponding container, and cam means for rotating said device to secure the closure on the container.

25. A machine for applying closures to containers comprising a rotary support provided with means for holding a plurality of containers, closure engaging devices rotatable with said support adjacent each of said holding means, means for feeding closures to said devices, and cam means arranged concentric with the axis of said support for moving said devices to apply the closures to the containers and subsequently rotating said devices to secure the closures thereon.

26. A machine for applying closures to containers comprising a rotary frame having means for holding a plurality of containers, a plurality of rotatable devices on said frame having closure gripping means and movable toward and from said holding means, cam means arranged concentric with the axis of said frame for actuating said gripping means and effecting said movement of the devices, actuating means for rotating said devices having releasable connection therewith, and means for automatically controlling said connection.

27. A machine for applying closures to containers comprising a rotary frame having means for holding a plurality of containers, a plurality of rotatable devices on said frame having closure gripping means and movable toward and from said holding means, cam means arranged concentric with the axis of said frame for effecting said movement of the devices, actuating means for said gripping means, means for rotating said devices including clutches, and means for automatically controlling said clutches.

28. A machine for applying closures to containers comprising a rotary frame having means for holding a plurality of containers, a plurality of rotatable devices on said frame having closure gripping means and movable toward and from said holding means, cam means arranged concentric with the axis of said frame for actuating said gripping means and effecting said movement and rotation of the devices, a clutch controlling the rotation of the devices and cam means for operating said clutch.

29. A machine for applying closures to containers comprising a rotary frame having means for holding a plurality of containers, a plurality of rotatable devices movable on said frame toward and from said holding means and having yieldably carried closure gripping means, means for actuating said gripping means and for effecting said movement of the devices to bring the closures into yielding engagement with the containers, an adjusting device operating selectively during rotation of said frame to adjust the position of closures not in preliminary registry with the respective containers, and actuating means for rotating said devices to screw the closures on the containers.

30. A machine for capping containers with caps having an interrupted thread engagement with the latter comprising a rotary frame provided with supporting means for a plurality of containers, a plurality of yieldably supported, rotary capping devices on said frame, operating means effecting relative movement of said supporting means and devices to bring the containers and caps into yielding engagement, adjusting means for relatively rotating said supporting means and devices to effect initial registry and seating of the caps on the threaded portions of the containers, actuating means for rotating said devices to screw the caps on the containers, and means for rotating said frame.

31. A machine for capping containers with caps having an interrupted thread engagement with the latter comprising a rotary frame provided with supporting means for a plurality of containers, a plurality of rotary capping devices on said frame, operating means for moving said devices to bring the caps into engagement with the containers, said devices having means for yieldably supporting the caps in said engagement prior to registry with the threaded portions of the containers, an adjusting wiper disposed for selective engagement during rotation of said frame with devices having unregistered caps to rotate said devices and register and seat said caps, actuating means for rotating said devices to screw the caps on the containers, and means for rotating said frame.

32. A machine for capping containers with caps having an interrupted thread engagement the latter comprising a rotary frame provided with supporting means for a plurality of containers, a plurality of resiliently supported, rotary capping devices on said frame, feeding means for supplying caps to said devices, operating means effecting relative movement of said supporting means and devices to bring the containers and caps into yielding engagement, adjusting means for relatively rotating said supporting means and devices to effect initial registry and seating of the caps on the threaded portions of the containers, cam means effecting partial rotation of said devices to screw the caps on the containers, and means for rotating said frame.

33. A machine for applying closures to containers comprising a rotary frame provided with means for holding a plurality of containers, container conveying means cooperating with said holding means, a plurality of spindles carried by said frame having means for gripping the closures, closure feeding means, actuating means for said gripping means, operating means effecting longitudinal movement of said spindles, and actuating means for rotating said spindles to screw the caps on the containers.

34. A machine for applying closures to containers comprising a rotary frame provided with means for holding a plurality of containers, container conveying means cooperating with said holding means, a plurality of spindles rotatable and longitudinally movable on said frame and provided with means for gripping the closures, closure feeding means, and a plurality of cams arranged concentrically of the axis of said frame for effecting said movements of the spindles and actuating said gripping means, to apply and secure the closures on the containers.

35. A machine for applying closures to containers comprising a rotary frame provided with movable means for positioning and holding a plurality of containers in spaced operating positions thereon, container conveying means cooperating with said movable means, a plurality of spindles rotatable and longitudinally movable on said frame and provided with means adjacent said operating positions for gripping the closures, and a plurality of cams arranged concentrically of the axis of said frame for actuating said movable means and said gripping means and effecting said movements of the spindles for securing the closures on the containers.

36. A machine for applying closures to containers comprising a rotary frame provided with means for holding a plurality of containers, conveying means for carrying containers to and from said holding means at respective points in the path of rotation thereof, closure feeding means stationarily positioned adjacent the path of movement of said frame, a plurality of devices on said frame having a rotary movement and a movement toward and from said holding means and provided with closure gripping means, and operating means for effecting said movements and actuating the gripping means of said devices in succession to obtain closures from said feeding means and apply and screw the same on the containers during the movement of the latter with the frame between said points of cooperation with the conveying means.

37. A machine for applying screw closures to containers comprising a standard, a rotary frame thereon provided with means for holding a plurality of containers, a plurality of closure engaging devices on said frame having a rotary movement and a movement toward and from said holding means, and separate cam means on said standard for effecting each of said movements of said devices to screw the closures on the containers.

38. A machine for applying closures to containers comprising a standard, a rotary frame thereon provided with movable means for positioning and holding a plurality of containers, container conveying means cooperating with said movable means, a plurality of closure engaging devices on said frame having a rotary movement and a movement toward and from said movable means, and means including a plurality of cams on said standard for actuating said movable means and effecting said movements of said closure engaging devices.

39. A machine for applying closures to containers comprising a standard, a rotary support thereon provided with movable means for positioning and holding a plurality of conainers, container conveying means cooperating with said movable means, closure applying mechanism rotatable on the standard with said support and including a plurality of closure engaging devices, cam means on said standard, parts movably carried by said support and mechanism for cooperation with said cam means and with said movable means and devices to actuate the latter, and means for rotating said support and mechanism.

40. A machine for applying screw closures to containers comprising a standard, a lower frame portion rotatable thereon provided with means for holding a plurality of containers, container feeding means cooperating with said lower frame portion, an upper frame portion rotatable on said standard and provided with a plurality of closure engaging devices, closure feeding means for the devices of said upper frame portion, means for synchronously rotating said frame portions and for effecting relative rotation between said container holding means and closure devices to screw the closure on the container, and adjusting means for moving one of said portions toward and from the other to accommodate containers of different dimensions and for simultaneously adjusting the corresponding feeding means.

41. A machine for applying screw closures to containers comprising a standard having a column adjustably carried thereby, a lower frame portion rotatable on said standard and provided with means for holding a plurality of containers, container feeding means cooperating with said lower frame portion, an upper frame portion rotatable on said column and provided with a plurality of closure engaging devices, means for synchronously rotating said frame portions and for effecting relative rotation between said container holding means and closure devices for screwing a closure on a container, and adjusting means for moving said column on the standard to adjust said upper frame portion toward and from said lower frame portion to accommodate containers of different dimensions.

42. A machine for applying screw closures to containers comprising a standard having a column adjustably carried thereby, a lower frame portion rotatable on said standard and provided with means for holding a plurality of containers, container feeding means cooperating with said lower frame portion, an upper frame portion rotatable on said column and provided with a plurality of chucks having relatively movable jaws for gripping and carrying a closure, closure feeding means for the devices of said upper frame portion adjustably carried on the standard, means for synchronously rotating said frame portions and for effecting relative rotation between said container holding means and chucks to screw the closures on the containers, and adjusting means for moving the column on the standard to adjust said upper frame portion toward and from said lower frame portion and for simultaneously adjusting said closure feeding means, to accommodate containers of different dimensions.

43. A machine for applying closures to containers comprising a standard having an adjustable column, a plurality of container holding means rotatable on the standard, a plurality of closure engaging devices rotatable on the column, means for synchronously rotating said holding means and devices, actuating means for said devices carried by the column, a second column adjustable on the standard, closure feeding means for said devices on said second column, gears rotatably carried by the standard in threaded engagement with said columns respectively, and a common means for rotating said gears to adjust said columns and adapt the machine for containers of different sizes.

44. In a machine for applying closures to containers, the combination of container supporting means, closure applying mechanism having relatively movable parts adapted to grip and carry a closure, operating means effecting relative movement of said supporting means and mechanism toward and from each other to apply the closure to the container, and actuating means for automatically moving said gripping parts toward and from gripping position independently of contact with a closure comprising a device normally restrained by contact of said parts with a closure for returning said parts from gripping position when not supplied with a closure to avoid contact of said parts with a container.

45. In a machine for applying closures to containers, the combination of container supporting means, relatively movable parts adapted to grip and carry a closure, operating means effecting relative movement of said supporting means and parts toward and from each other to apply the closure to the container, closure feeding means, positive actuating means for moving said parts to position to grip a closure supplied by said feeding means and to release the closure after application to a container, said parts being frictionally maintained for an interval in gripping position by engagement with the closure, and a device for returning said parts from gripping position when not supplied with a closure prior to said movement of said supporting means and parts for avoiding contact of said parts with a container.

46. In a machine for applying closures to containers, the combination of rotary supporting means for a plurality of containers, a plurality of rotary closure applying mechanisms each having a plurality of relatively movable parts adapted to grip and carry a closure, operating means for moving said supporting means and mechanisms toward and from one another to apply the closures to the containers, closure feeding means, actuating means for moving said parts to position to grip a closure supplied by said feeding means, said parts being retained in gripping position by engagement with a closure, and a device for each mechanism normally restrained by the engagement of a closure for returning said parts from gripping position when not supplied with a closure for avoiding contact of said parts with a container.

47. A machine for applying screw caps to containers comprising a rotary frame provided with relatively movable members for gripping the sides of a plurality of containers in spaced relation with the tops thereof to permit insertion of the latter in the caps and to hold the containers against rotation, a plurality of rotary cap applying devices on said rotary frame each having a chuck provided with relatively movable jaws for gripping a cap, mechanism including a stationary cam for effecting movement of said chucks on said frame toward and from said container holding means to apply the caps to the containers, means including a stationary part having a coordinating arrangement relative to said stationary cam for effecting closing movement of said chuck jaws independently of pressure against the cap, and actuating means for rotating said devices and chucks during rotation of said frame for rotating the caps and screwing the same on the containers.

48. In a machine for applying screw closures to containers, the combination of a rotary frame provided with means for holding a plurality of containers, a plurality of rotary closure applying devices on said rotary frame each comprising members movable together on said frame and having also a movement relative to one another and one carrying chuck jaws and the other carrying means for actuating said jaws to grip a closure, actuating means for effecting said relative movement of said members for actuating said chuck jaws to grip and release a closure, operating means for moving said members together toward and from said container holding means to apply the closures to the containers, and actuating means for rotating said devices and chuck jaws for rotating the closures carried thereby and screwing the same on the containers.

49. In a machine for applying screw closures to containers, the combination of a rotary frame provided with means for holding a plurality of containers, a plurality of rotary closure applying devices on said rotary frame each comprising concentric members movable together on said frame and also relatively one within another, one of said members carrying relatively movable chuck jaws and the other carrying means for actuating said jaws to grip and release a closure, actuating means for effecting said relative movement of said members for actuating said chuck jaws, operating means comprising a stationary cam for moving said members together toward and from said container holding means to apply the closures to the containers, and actuating means for rotating said chuck jaws and the closures gripped thereby to screw the latter on the containers.

50. In a machine for applying screw closures to containers, the combination of a rotary frame comprising a table and a plurality of sets of relatively movable parts thereon for clamping and releasing the containers, cam means for operating said clamping parts, a plurality of closure applying devices on said frame each provided with relatively movable chuck jaws for gripping and releasing the closures, cam means effecting relative gripping movement of said chuck jaws independently of contact with the closures, cam operated means effecting relative movement of said container clamping means and chuck jaws for bringing the closures and containers together, and actuating means for rotating said chuck jaws and the closures gripped thereby for screwing the latter on the containers.

51. In a bottle-sealing machine, a moving bottle-holder, a coacting seal-clamping device and stationary wiping means to partially rotate the seal on the bottle before clamping.

THEODORE E. PENNOCK.